United States Patent
Schmatloch

(10) Patent No.: US 8,080,609 B2
(45) Date of Patent: Dec. 20, 2011

(54) LOW ENERGY SURFACE BONDING SYSTEM CONTAINING A PRIMER WITH LONG OPEN TIME

(75) Inventor: Stefan Schmatloch, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 282 days.

(21) Appl. No.: 12/608,366

(22) Filed: Oct. 29, 2009

(65) Prior Publication Data

US 2010/0105829 A1    Apr. 29, 2010

Related U.S. Application Data

(60) Provisional application No. 61/109,415, filed on Oct. 29, 2008.

(51) Int. Cl.
| | |
|---|---|
| B05D 3/02 | (2006.01) |
| B32B 27/00 | (2006.01) |
| B32B 27/40 | (2006.01) |
| C08G 18/00 | (2006.01) |
| C08G 18/08 | (2006.01) |
| C08G 18/10 | (2006.01) |
| C08G 18/28 | (2006.01) |
| C08G 77/04 | (2006.01) |
| C08G 77/06 | (2006.01) |
| C08J 3/00 | (2006.01) |
| C08K 3/20 | (2006.01) |
| C08L 75/00 | (2006.01) |
| C08L 83/00 | (2006.01) |
| C08L 83/04 | (2006.01) |
| C09J 4/00 | (2006.01) |
| C09J 7/02 | (2006.01) |
| C09J 101/00 | (2006.01) |
| C09J 201/00 | (2006.01) |

(52) U.S. Cl. ............... 524/588; 156/329; 156/331.4; 156/331.5; 156/331.7; 427/372.2; 427/385.5; 428/423.1; 524/589; 524/590; 524/906; 528/14; 528/21; 528/25; 528/27; 528/28; 528/44; 528/59; 528/85

(58) Field of Classification Search ............ 156/329, 156/331.4, 331.5, 331.7; 427/372.2, 385.5; 428/423.1; 524/588, 589, 590, 906
See application file for complete search history.

(56) References Cited

U.S. PATENT DOCUMENTS

| | | |
|---|---|---|
| 3,152,162 A | 10/1964 | Fischer et al. |
| 3,549,396 A | 12/1970 | Dietz |
| 3,743,626 A | 7/1973 | Emmons |
| 4,367,313 A | 1/1983 | Rizk et al. |
| 4,374,210 A | 2/1983 | Ewen et al. |
| 4,374,237 A | 2/1983 | Berger et al. |
| 4,385,133 A | 5/1983 | Alberino et al. |
| 4,394,491 A | 7/1983 | Hoffman |
| 4,396,681 A | 8/1983 | Rizk et al. |
| 4,496,611 A | 1/1985 | Kawakubo |
| 4,522,975 A | 6/1985 | O'Connor et al. |
| 4,643,794 A | 2/1987 | Saracsan |
| 4,672,100 A | 6/1987 | Schonbachler |
| 4,687,533 A | 8/1987 | Rizk et al. |
| 4,697,026 A | 9/1987 | Lee |
| 4,735,830 A | 4/1988 | Oezelli et al. |
| 4,780,520 A | 10/1988 | Rizk et al. |
| 4,792,316 A | 12/1988 | Skedeleski et al. |
| 4,835,012 A | 5/1989 | Saur |
| 4,839,122 A | 6/1989 | Weaver |
| 4,874,805 A | 10/1989 | Mulhaupt et al. |
| 4,906,707 A | 3/1990 | Yukimoto et al. |
| 4,910,279 A | 3/1990 | Gillis |
| 4,963,614 A | 10/1990 | Ito et al. |
| 5,010,202 A | 4/1991 | Greco |
| 5,011,900 A | 4/1991 | Yukimoto et al. |
| 5,063,269 A | 11/1991 | Hung |
| 5,063,270 A | 11/1991 | Yukimoto et al. |
| 5,114,989 A | 5/1992 | Elwell et al. |
| 5,128,423 A | 7/1992 | Parrinello |
| 5,167,899 A | 12/1992 | Jezic |
| 5,342,914 A | 8/1994 | Iwakiri et al. |
| 5,391,588 A | 2/1995 | Sakamoto |
| 5,466,727 A | 11/1995 | Hsieh |
| 5,529,655 A | 6/1996 | Bravet |
| 5,567,530 A | 10/1996 | Drujon et al. |

(Continued)

FOREIGN PATENT DOCUMENTS

EP    149856    7/1985

(Continued)

OTHER PUBLICATIONS

Copending U.S. Appl. No. 12/033,420, filed Feb. 19, 2008; Published on Oct. 30, 2008 as US 2008/0268261 A1; Patent Issued on Jun. 7, 2011 as US 7,955,702 B2 (1062-063).* Copending U.S. Appl. No. 12/033,447, filed Feb. 19, 2008; Published on Oct. 30, 2008 as US 2008/0269452 A1; Patent issued on Oct. 5 2010 as US 7,807,016 B2 (1062-075).*
Copending U.S. Appl. No. 12/035,770, filed Dec. 18, 2007: Published on Jan. 15, 2009 as US 2009/0017312 A1 (1062-066).*
Copending U.S. Appl. No. 12/041,915, filed Mar. 4, 2008; Published on Oct. 30, 2008 as US 2008/0268259 A1; Patent Issued on Apr. 6, 2010 as US 7,691,479 B2 (1062-074).*

(Continued)

*Primary Examiner* — Patrick Niland

(57) ABSTRACT

The invention is a composition comprising a) one or more prepolymers having on average three or more aliphatic isocyanate groups and further containing alkoxysilane groups; b) one or more aromatic polyisocyanates; c) one or more compounds having at least one heterocyclic ring which hydrolyzes when exposed to moisture to form at least one isocyanate reactive group; d) one or more solvents; and e) one or more amine and/or organometallic polyurethane catalysts; wherein the ratio of aromatic isocyanate groups to aliphatic isocyanate groups in the composition is from about 0.5:1.0 to about 1.5:1.0, preferably about 0.9:1.0 to about 1.5:1.0, and the equivalent ratio of isocyanate groups to isocyanate reactive groups derivable from the one or more compounds having at least one hydrolyzable heterocyclic ring is from about 0.8:1.0 to about 5.3:1.0, and most preferably about 1.5:1.0 to about 1.7:1.0.

20 Claims, No Drawings

U.S. PATENT DOCUMENTS

| | | | |
|---|---|---|---|
| 5,576,558 A | 11/1996 | Matsuda et al. |
| 5,603,798 A | 2/1997 | Bhat |
| 5,623,044 A | 4/1997 | Chiao |
| 5,650,467 A | 7/1997 | Suzuki et al. |
| 5,664,041 A | 9/1997 | Szum |
| 5,840,428 A | 11/1998 | Blizzard |
| 5,852,137 A | 12/1998 | Hsieh et al. |
| 5,922,809 A | 7/1999 | Bhat et al. |
| 5,948,927 A | 9/1999 | Gunther |
| 5,976,305 A | 11/1999 | Bhat et al. |
| 6,008,305 A | 12/1999 | Wang |
| 6,048,579 A | 4/2000 | Wang et al. |
| 6,080,817 A | 6/2000 | Thieben et al. |
| 6,133,398 A | 10/2000 | Bhat et al. |
| 6,228,433 B1 | 5/2001 | Witt |
| 6,395,856 B1 | 5/2002 | Petty et al. |
| 6,438,306 B1 | 8/2002 | Bishop |
| 6,512,033 B1 | 1/2003 | Wu |
| 6,592,998 B2 | 7/2003 | Anderson et al. |
| 6,592,999 B1 | 7/2003 | Anderson et al. |
| 6,623,791 B2 | 9/2003 | Sadvary et al. |
| 6,649,016 B2 | 11/2003 | Wu et al. |
| 6,875,470 B2 | 4/2005 | Trabesinger et al. |
| 6,974,500 B2 | 12/2005 | Miyata et al. |
| 7,022,748 B2 | 4/2006 | Wilke et al. |
| 7,087,127 B2 | 8/2006 | Mahdi et al. |
| 7,122,289 B2 | 10/2006 | Wilke et al. |
| 7,332,225 B2 | 2/2008 | Lewno |
| 7,691,479 B2 | 4/2010 | Schmatloch et al. |
| 7,781,493 B2 | 8/2010 | Baikerikar et al. |
| 7,786,183 B2 | 8/2010 | Baikerikar et al. |
| 7,807,016 B2 | 10/2010 | Schwoeppe et al. |
| 7,939,161 B2 | 5/2011 | Allam et al. |
| 7,955,696 B2 | 6/2011 | Baikerikar et al. |
| 7,955,702 B2 | 6/2011 | Schwoeppe et al. |
| 7,956,151 B2 | 6/2011 | Schmatloch et al. |
| 2001/0041782 A1 | 11/2001 | Okuhira et al. |
| 2002/0001550 A1 | 1/2002 | Shinjo et al. |
| 2002/0086914 A1 | 7/2002 | Lee et al. |
| 2003/0084955 A1 | 5/2003 | Zhang |
| 2003/0100676 A1 | 5/2003 | Okuhira et al. |
| 2003/0105230 A1 | 6/2003 | Hellmann |
| 2003/0232152 A1 | 12/2003 | Allam et al. |
| 2004/0106718 A1 | 6/2004 | Krohn |
| 2004/0191521 A1 | 9/2004 | Weiss et al. |
| 2005/0081995 A1 | 4/2005 | Beckley |
| 2005/0113484 A1 | 5/2005 | Kamen et al. |
| 2005/0126414 A1 | 6/2005 | Weiss et al. |
| 2005/0126683 A1 | 6/2005 | Hsieh |
| 2005/0154076 A1 | 7/2005 | Bach |
| 2006/0124225 A1 | 6/2006 | Wu et al. |
| 2006/0198963 A1 | 9/2006 | Chernyshov et al. |
| 2006/0287408 A1 | 12/2006 | Baikerikar et al. |
| 2008/0145564 A1 | 6/2008 | Allam et al. |
| 2008/0152926 A1 | 6/2008 | Baikerikar et al. |
| 2008/0213545 A1 | 9/2008 | Allam et al. |
| 2008/0268259 A1 | 10/2008 | Schmatloch et al. |
| 2008/0268261 A1 | 10/2008 | Schwoeppe et al. |
| 2008/0269452 A1 | 10/2008 | Schwoeppe et al. |
| 2009/0017312 A1 | 1/2009 | Allam et al. |
| 2009/0162592 A1 | 6/2009 | Baikerikar et al. |
| 2010/0063196 A1 | 3/2010 | Schmatloch et al. |
| 2010/0316828 A1 | 12/2010 | Baikerikar et al. |

FOREIGN PATENT DOCUMENTS

| | | | |
|---|---|---|---|
| EP | 0414375 A1 | 2/1991 |
| EP | 0 592 138 A | 4/1994 |
| EP | 0 666 290 A1 | 9/1995 |
| EP | 0 687 713 B1 | 10/1997 |
| EP | 1 153 090 A0 | 12/2000 |
| EP | 1217049 A1 | 6/2002 |
| EP | 1 231 241 A1 | 8/2002 |
| EP | 1 382 625 A | 1/2004 |
| JP | 09-235513 A | 9/1997 |
| JP | 10-036481 A | 2/1998 |
| JP | 2002-012635 A | 1/2002 |
| JP | 2002-309163 A | 10/2002 |
| JP | 2002-309182 A | 10/2002 |
| JP | 2003-128988 A | 5/2003 |
| JP | 2003-226731 A | 8/2003 |
| JP | 2003-336008 A | 11/2003 |
| JP | 2004-168957 A | 6/2004 |
| JP | 2007-063551 A | 3/2007 |
| WO | 00/00530 A1 | 1/2000 |
| WO | 00/06512 A1 | 2/2000 |
| WO | 01/47644 A1 | 7/2001 |
| WO | 01/77245 A2 | 10/2001 |
| WO | 03/011583 A1 | 2/2003 |
| WO | 03/011992 A2 | 2/2003 |
| WO | 03011986 A1 | 2/2003 |
| WO | WO03-019745 | 6/2003 |
| WO | WO03-106579 | 6/2003 |
| WO | 2006/042305 A1 * | 4/2006 |
| WO | 2008/036721 A1 * | 3/2008 |
| WO | 2008/045726 A * | 4/2008 |
| WO | 2008/134110 A1 * | 11/2008 |

OTHER PUBLICATIONS

Copending U.S. Appl. No. 12/618,298, filed Nov. 13, 2009; Published on Mar. 11, 2010 as US 2010/0063196 A1; Patent Issued on Jun. 7, 2011 as US 7,956,151 B2 (1062-074D1).*

Bayer, Desmodur RFE, Bayer Product Datasheet, Aug. 12, 2004, 1-3, Bayer MaterialScience LLC.*

Dow, Case Polyurethanes, accessed at http://www.dow.com/case/, last accessed Jun. 21, 2006.*

Dow, Polyols Dow Polyurethans CASE Market Applications, Form No. 109-01639-0903P&M, 1-2 The Dow Chemical Company, accessed Jun. 21, 2006.*

International Search Report dated Mar. 26, 2010, PCT/US2009/062498.

Huntsman, "Jeffcat amine catalysts for the polyurethane industry" Technical Bulletin pp. 1-4 and 2 additional charts, 2005.

Oxazolidine selection guide, prior to May 5, 2011.

Crankley, "Polyurethane Dispersion based Pressure Sensitive Adhesives", between 2002 and May 5, 2011.

Dinitrol D-9000, Technical Data Sheet, High Modulus/Nonconductive Urethan Adhesive, Jan. 2006.

Voranol 230-660, Production Information, Polyether Polyol, published Aug. 2001.

Desmodur RFE, "Polisocyanate Crosslinking Agent" Product code R751, Jul. 2002.

Betaprime, "Urethan Primers" available at http://automotive.dow.com/after/products/urethaneprimers.htm, last accessed Jun. 20, 2006.

Desmodur N100, Bayer Product Datasheet, published Nov. 3, 2005.

Kohler, Journal of American Chemical Society, vol. 49, p. 3181 (1927).

* cited by examiner

LOW ENERGY SURFACE BONDING SYSTEM CONTAINING A PRIMER WITH LONG OPEN TIME

CROSS REFERENCE TO RELATED APPLICATION

This application claims priority to U.S. Provisional Application Ser. No. 61/109,415 titled "Low Energy Surface Bonding System Containing a Primer with Long Open Time" filed Oct. 29, 2008, the entire contents thereof are incorporated herein by reference.

FIELD OF INVENTION

The invention relates to a primer useful for linking polyisocyanate functional adhesives to substrate surfaces, including low surface energy substrates, which primer exhibits a long open time. In another embodiment, the invention relates to a bonding system containing the primer and an isocyanate functional adhesive. The invention also relates to articles primed with the primer and to articles bonded with the bonding system of the invention.

BACKGROUND OF THE INVENTION

Plastic parts are becoming more popular in a variety of manufactured items. Plastic parts provide cost and weight savings along with flexible design capability. Low surface energy plastics, such as polyolefins, are favored for use in many manufactured articles because of their cost, design and processing advantages. Many manufactured articles contain parts manufactured from different materials because of the different functions and operating requirements of the parts. Some parts are preferably manufactured from low surface energy plastics and others are manufactured from high surface energy plastics, metal, wood and/or glass.

Assembly of manufactured articles utilizing adhesives is advantageous because adhesives offer design and process flexibility. Isocyanate functional adhesive systems (often referred to as polyurethane adhesives) are popular adhesive systems for bonding a variety of substrates because polyisocyanate based adhesives bond well to a large number of substrates. Isocyanate functional adhesives systems can be formulated to to provide a wide variety of properties depending on the substrates and the use of the manufactured articles.

Low energy plastic surfaces typically require some kind of surface treatment to facilitate bonding of isocyanate functional adhesive systems to such surfaces. Such treatments include one or more of flame treatment, corona discharge treatment, chemical etching of the surface and/or primer application. Typical primer systems are utilized in processes wherein the primer is applied, the solvent carrier is allowed to volatilized away and then the adhesive is applied to the surface of the substrate. Known systems for bonding low surface energy plastic parts together or to other substrates typically allow for a relatively short open time between application of the primer and application of the adhesive. Examples of these systems are found in EP 149,856 and U.S. Pat. No. 5,576,558, both incorporated herein by reference. Open time as used in this context refers to the time period after the solvent volatilizes off wherein the primer still links up to the adhesive system. Link up as used refers to chemical bonding of an adhesive to functional groups of the adhesive.

Low energy surface plastic parts are frequently utilized on automobiles, for instance as interior parts and bumper facia. Sheet molding compound is utilized in body parts and can be a difficult surface to bond to. Many manufacturers including automobile manufacturers do not like to have primers used in assembly plants because automobile workers are exposed to the solvent vapors and because environmental and safety regulations may require solvent removal and venting systems. Thus the use of primers in assembly operations can add cost and health and safety concerns to assembly plants. What is desirable are primers having a long open time thereby allowing application to substrates at a time and location remote from the assembly operations. In the context of automobile manufacture this means that component parts are primed in the plant of the component supplier and then shipped to the plant where the automobiles are assembled. Commonly owned patent application U.S. Ser. No. 12/033,420 filed Feb. 19, 2008 and Patent Cooperation Treaty Application PCT/U.S. Ser. No. 08/054,273 titled "One Component Glass Primer Including Oxazoladine" disclose a long open time primer system useful for linking polyisocyanate functional adhesive systems to glass, incorporated herein by incorporated herein by reference. Long open time primer systems for linking isocyanate functional adhesive systems to low energy plastic surfaces are not disclosed in these applications.

What is needed is a primer system that is capable of linking an isocyanate functional adhesive system to a low surface energy substrate which has a long open time, up to 90 days or longer. What is further needed is primer systems that can also be used on a variety of other substrates and which can be used in bonding low surface energy plastic substrates and other substrates, such as glass, metal, coated metal and plastic substrates which have relatively high surface energies.

SUMMARY OF INVENTION

In one embodiment the invention is a composition comprising
a) one or more prepolymers having on average three or more aliphatic isocyanate groups and further containing alkoxysilane groups; b) one or more aromatic polyisocyanates; c) one or more compounds having at least one heterocyclic ring which hydrolyzes when exposed to moisture to form at least one isocyanate reactive group; d) one or more solvents; and e) one or more amine and/or organometallic polyurethane catalysts; wherein the ratio of aromatic isocyanate groups to aliphatic isocyanate groups in the composition is from about 0.5:1.0 to about 1.5:1.0, preferably from about 0.9:1.0 to about 1.5:1.0, and the equivalent ratio of isocyanate groups to isocyanate reactive groups derivable from the one or more compounds having at least one hydrolyzable heterocylic ring is from about 0.8:1.0 to about 5.3:1.0, and most preferably from about 1.5:1.0 to about 1.7:1.0. In a preferred embodiment, the composition further comprises a film forming resin. In another preferred embodiment, the one or more compounds having at least one heterocyclic ring which hydrolyzes when exposed to moisture comprises one or more compounds containing one of more azole groups.

In another embodiment the invention is a system for bonding two substrates together which comprises a composition as described above and an isocyanate functional adhesive. Preferably the isocyanate functional adhesive is a one part adhesive system and preferably cures by exposure to moisture.

In another embodiment, the invention is a method of priming a surface to enhance the bond of a polyisocyanate functional adhesive to the surface which comprises contacting a composition according to the invention with the surface and allowing the solvent to evaporate. In another embodiment, the invention is a method of bonding two substrates together which comprises a) applying a composition of the invention to the surface of one or more of the substrates and allowing the solvent to evaporate away; b) applying an isocyanate functional adhesive to the surfaces of the two or more substrates to which the composition was applied according to step a); c) contacting the two or more substrates together with the adhesive disposed between the substrates; and d) allowing the adhesive to cure so as to bond the two or more substrates together. In a preferred embodiment at least one of the substrates is a low surface energy plastic which is surface treated. In another preferred embodiment step a) is performed at a time and/or location remote from step b).

In another embodiment the invention is a substrate having deposited on one or more surfaces of the substrate, the composition of the invention. In one preferred embodiment the substrate is a low surface energy substrate which is surface treated. After the solvent has volatilized away, only the solids of the composition remain on the surface, thus the composition of the invention minus the solvent is located on the surface of the substrate.

In yet another embodiment, the invention comprises an assembly comprising two or more substrates bonded together by the composition of the invention and an isocyanate functional adhesive system. Typically the composition located on the surface of the one or more substrates does not contain the solvent. The cured adhesive can be a polyurethane, polyurea or polyurethane-polyurea. One or more of the substrates can be a low surface energy plastic. In another embodiment one substrate is a low surface energy plastic and another has a higher surface energy.

The composition of the invention can be used to bond a variety of parts together including surface low energy plastic parts, higher surface energy plastic parts, metal parts, glass parts, coated metal parts, composite parts and wood parts. The open time of the composition of the invention when utilized as a primer system can be as long as 90 days, more preferably as long as 9 months and most preferably as long as 1 year. Preferably the open time is between 20 seconds and 90 days, more preferably between 20 seconds and 9 20 seconds and 9 months, at 23° C. and 50 percent relative humidity to 32° C. and 80 percent relative humidity. The systems of the invention can be used to bond interior trim to vehicle interiors, bond plastic parts to glass, fascia to bumper systems and plastic parts, such as trim, to metal, composite or sheet molding compound based body parts.

DETAILED DESCRIPTION OF THE INVENTION

Open time as used herein refers to the time from application of a primer system wherein the primer system is capable of linking up to an isocyanate functional adhesive. In a preferred embodiment, the open time starts when the solvent of the primer system has volatilized away after application to a substrate and ends when the part of the composition remaining on the surface of the substrate is no longer able to link up to the adhesive system. Evidence of the failure to link the adhesive to the primer system is adhesive failure from the surface of the primed surface in performance testing as described hereinafter. Link up as used herein refers to the ability of the primer system to chemically react with the adhesive system to form chemical bonds. Evidence of link up is demonstrated by cohesive failure in performance testing as described hereinafter. Surface treatment as used with respect to low surface energy plastics means treatment of the surface to oxidize the surface to create additional polar groups on the surface of the plastic. This can be achieved by treatment of the surface by chemical etching, flame treatment, corona discharge and the like.

By low surface energy substrates (plastics) is meant materials that have a surface energy of about 45 mJ/m$^2$ or less, more preferably about 40 mJ/m$^2$ or less and most preferably about 35 mJ/m$^2$ or less. Included among such materials are polyethylene, polypropylene, acrylonitrile-butadiene-styrene, polyamides, syndiotactic polystyrene, olefin containing block co-polymers, and fluorinated polymers such as polytetrafluoroethylene (TEFLON) which has a surface energy of less than about 20 mJ/m$^2$. (The expression "surface energy" is often used synonymously with "critical wetting tension" by others.)

High or higher energy surface means that the surface has a significant number of polar groups on the surface to allow an adhesive system to bond to the surface (link up to the surface). Often an adhesive system, such as an isocyanate functional adhesive system, is capable of bonding to a higher surface energy substrate without the need for a primer primer system or a surface treatment.

One component of the composition of the invention is one or more prepolymers having on average three or more aliphatic isocyanate groups and further containing alkoxysilane groups. An aliphatic isocyanate group is an isocyanate group bonded to a nonaromatic carbon atom. Prepolymer as used herein refers to the reaction product of one or more aliphatic polyisocyanates with one or more compounds having three or more reactive hydrogen atoms under conditions that the prepolymer has on average three or more isocyanate reactive groups. The aliphatic isocyanate containing prepolymer further comprises alkoxy silane groups. Alkoxy silane groups comprise a silicon atom having one or more alkoxy groups bonded to the silicon atom. Preferably the silicon atoms have two or three alkoxy groups bonded thereto. The silicon atoms can be further bonded to carbon, silicon or hetero atoms such as oxygen, nitrogen or sulfur. Alkoxy silanes are incorporated into the aliphatic isocyanate containing prepolymer by reacting a compound having one or more alkoxy silanes and one or more isocyanate reactive groups or isocyanate groups with the aliphatic isocyanate and the isocyanate reactive compound. Preferably, the aliphatic isocyanate containing prepolymer has 4 or more aliphatic isocyanate groups. Preferably, the aliphatic isocyanate containing prepolymer has 6 or less aliphatic isocyanate groups and more preferably 5 or less aliphatic isocyanate groups.

The term "isocyanate-reactive compound" as used herein includes any organic compound having at least two isocyanate-reactive moieties, such as a compound containing an active hydrogen moiety, or an imino-functional compound. For the purposes of this invention, an active hydrogen containing moiety refers to a moiety containing a hydrogen atom which, because of its position in the molecule, displays significant activity according to the Zerewitnoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate reactive compound is a polyol, and is more preferably a polyether polyol. Preferable polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each alkylene oxides. In one preferred embodiment, the polyol comprises propylene oxide chains with ethylene oxide chains capping the polyol. Preferably, the isocyanate-reactive compound has a functionality of at least about 3.0 and is most preferably at least about 4.0; and is preferably no greater than about 6.0 and is most preferably no greater than about 5.0. Preferably, the equivalent weight of the isocyanate-reactive compound is at least about 50, more preferably at least about 100, and is more preferably at least about 300; and is preferably no greater than about 1,500 and is most preferably no greater than about 1,000.

The prepolymers utilized in the invention may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. The isocyanate content in the prepolymers is preferably about 0.1 percent by weight or greater, more preferably about 1.5 percent by weight or greater and most preferably about 1.8 percent by weight or greater. The isocyanate content in the prepolymers is preferably about 10 percent by weight or less, more preferably about 5 percent by weight or less, even more preferably 4.5 percent by weight or less and most preferably 3 percent by weight or less. "Isocyanate content" means the weight percentage of isocyanate moieties to the total weight of the prepolymer. The reactions to prepare the prepolymers may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymers is catalyzed by stannous octoate. The amount of catalyst employed is generally between about 0.005 and about 5 parts by weight of the mixture catalyzed, depending on the nature of the isocyanate.

The aliphatic isocyanate containing prepolymer is present in the composition of the invention in a sufficient amount such that the composition of the invention is capable of linking to isocyanate functional prepolymers. Preferably, the aliphatic isocyanate containing prepolymers are present in an amount of about 40 parts by weight or greater based on the weight of the composition of the invention, more preferably about 45 parts by weight or greater and most preferably about 50 parts by weight or greater. Preferably, the aliphatic isocyanate containing prepolymers are present in an amount of about 90 parts by weight or less based on the weight of the composition of the invention, more preferably about 80 parts by weight or less and most preferably about 60 parts by weight or less.

Polyisocyanates useful in preparing the aliphatic isocyanate containing functional prepolymers include any isocyanate containing on average two or more isocyanate groups bonded to nonaromatic carbon atoms. Among preferred aliphatic polyisocyanates useful in this invention include ethylene diisocyanate, isophorone diisocyanate, bis(4-isocyanate cyclohexyl)methane, trimethyl hexamethylene diisocyanate, 1,4-tetramethylene diisocyanate, hexamethylene diisocyanate, 1,12-dodecane diisocyanate, cyclobutane-1,3-diisocyanate, cyclohexane 1,3- and 1,4-di-isocyanate and mixtures of these isomers; 1-isocyanato 3,3,5-trimethyl 5-isocyanato methyl cyclohexane and isophorone diisocyanate. More preferred aliphatic polyisocyanates include hexamethylene diisocyanate and isophorone diisocyanate The alkoxysilanes useful in preparing aliphatic isocyanate containing prepolymers include any alkoxy silanes having one or more isocyanate reactive or isocyanate groups. Preferably the alkoxy silanes have on average two to three alkoxy groups per silane. Preferred isocyanate reactive groups are groups with active hydrogen atoms. More preferred isocyanate reactive groups include hydroxyl, carboxylic acids, mercapto and amino groups are used. More preferred alkoxy silanes useful in the invention include 1-mercaptopropyl trimethoxy silane and bis(trimethoxy-silylpropyl) amine. The aliphatic isocyanate containing prepolymers preferably contain about 3.0 percent by weight or greater of alkoxy silane groups and more preferably contains about 8.0 percent by weight or greater of alkoxy silane groups. The aliphatic isocyanate containing prepolymers preferably contain about 30 percent by weight or less of alkoxy silane groups and more preferably contains about 25 percent by weight or less of alkoxy silane groups. The aliphatic isocyanate containing prepolymers preferably contain about 2.5 percent by weight or greater of isocyanate groups and more preferably contains about 3.5 percent by weight or greater of isocyanate groups. The aliphatic isocyanate containing prepolymers preferably contain about 6.0 percent by weight or less of isocyanate groups and more preferably contains about 5.0 percent by weight or less of isocyanate groups. The prepolymer having at least three or more aliphatic isocyanate groups has a sufficient number average molecular weight for use as a primer composition. Preferably the number average molecular weight ($M_n$) is about 500 Daltons or greater and more preferably 1,000 Daltons or greater. Preferably the number average molecular weight ($M_n$) is about 6,000 Daltons or less and more preferably 5,000 Daltons or less.

The composition of the invention further comprises one or more aromatic polyisocyanates. An aromatic polyisocyanate is a compound having on average about more than one, preferably more than about two isocyanate groups, bonded to aromatic carbon atoms. An aromatic isocyanate is an isocyanate bonded to an aromatic carbon atom. Any compound, oligomer or prepolymer having on average more than one, preferably more than about two, aromatic isocyanate groups may be used in this invention. The one or more aromatic polyisocyanates preferably comprises one or more of poly-isocyanates, polymeric polyisocyanates, or adducts of polyisocyanates with compounds having one or more isocyanate reactive groups. Even more preferably the one or more aromatic polyisocyanates comprises i) one or more polyisocyanates or polymeric polyisocyanates and ii) one or more adducts of polyisocyanates with compounds having one or more isocyanate reactive groups which further contain alkoxysilane groups. Even alkoxysilane groups. Even more preferably, the one or more adducts of polyisocyanates with compounds having one or more isocyanate reactive groups comprise the reaction product of a phosphorus containing polyisocyanate and an aminoalkylsilane containing two or more amino groups reactive with isocyanate groups. In the embodiment wherein the aromatic polyisocyanate is an adduct of a polyisocyanate and one or more compounds having one or more isocyanate reactive groups, the compounds containing isocyanate reactive groups can be any such compounds as described hereinbefore wherein the compounds having one or more isocyanate reactive groups have a number average molecular weight of 600 or greater, preferably 800 or greater and more preferably 1,000 or greater. The compounds having two or more isocyanate reactive groups preferably exhibit a number average molecular weight of 6,000 or less, preferably 5,000 or less and more preferably 4,500 or less. In a preferred embodiment, the adducts comprise adducts of aromatic polyisocyanates, compounds containing two or more isocyanate reactive compounds and one or more compounds having one or more alkoxy silane groups and one or more isocyanate reactive groups. The one or more compounds having one or more alkoxy silane groups and one or more isocyanate reactive groups useful herein are those described hereinbefore as useful in the prepolymers containing three or more aliphatic isocyanate groups. Among preferred aromatic polyisocyanates include methyl diphenyldiisocyanate, tolylene diisocyanate, phenylene diisocyanate, 2,4'- and 2,6-tolylene diisocyanate and mixtures of these isomers, naphthylene 1,5-diisocyanate, triphenylmethane 4,4', 4"-triisocyanate and polymeric derivates thereof and tris(isocyanatophenyl)thiophosphate. More preferred polyisocyanates comprise methyl diphenyldiisocyanate and polymeric derivatives thereof and tris(isocyanatophenyl)thiophosphate. In a preferred embodiment the aromatic polyisocyanate is a mixture of one or more aromatic polyisocyanates and/or polymeric derivatives thereof and one or more phosphate containing aromatic polyisocyanates. The aromatic polyisocyanates are present is sufficient quantity to facilitate substrate bonding and reaction with the ring opened hetrocyclic compounds. Preferably, the aromatic polyisocyanates are present in an amount of about 4 percent by weight or greater and most preferably 7 percent by weight or greater. Preferably the aromatic polyisocyanates are present in an amount of about 30 percent by weight or less, more preferably about 25 percent by weight or less, even more preferably about 22 percent by weight or less and most preferably about 18 percent by weight or less and most preferably about 18 percent by weight or less. In the embodiment wherein the aromatic polyisocyanates comprise one or more aromatic isocyanates and/or polymeric derivatives thereof and one or more phosphate containing aromatic polyisocyanates, the amount of aromatic polyisocyanate and/or polymeric derivatives thereof is about 1 percent by weight or greater and most preferably about 3 percent by weight of greater and the amount of phosphate containing aromatic polyisocyanates is about 1 percent by weight or greater and more preferably about 4 percent by weight or greater. In such embodiment, the amount of aromatic polyisocyanates and/or polymeric derivatives thereof is about 20 percent by weight or less, more preferably about 15 percent by weight or less and most preferably 11 percent by weight of less and the amount of phosphate containing aromatic polyisocyanates is about 10 percent by weight or less and more preferably about 7 percent by weight or less. In a preferred embodiment, the aromatic polyisocyanates have number average molecular weights of about 200 or greater and more preferably about 300 or greater. In a preferred embodiment, the aromatic polyisocyanates have number average molecular weights of about 800 or less and more preferably about 500 or less. In a preferred embodiment the aromatic polyisocyanates demonstrate an isocyanate content of about 0.9 to about 5.5 percent by weight.

The composition of the invention comprises one or more compounds having at least one heterocyclic ring which hydrolyzes when exposed to moisture to form at least one isocyanate reactive group. Preferably the cyclic ring contains one or more nitrogen and/or oxygen atoms and forms hydroxyl and or amino groups upon hydrolysis. Most preferably the heterocylic rings contain both at least one oxygen and at least one nitrogen atom. Preferably upon hydrolysis at least one hydroxyl and at least one amino group are formed. Preferably the heterocyclic rings are 5 or 6 membered with 5 membered rings being preferred. Preferably the heterocyclic rings are azole rings. In a preferred embodiment, the one or more compounds having at least one heterocyclic ring which hydrolyzes when exposed to moisture comprises one or more compounds containing one or more oxazolidine, isooxazolidine, oxazolidinone or oxazolidinedione groups. More preferably, the one or more compounds having at least one heterocyclic ring which hydrolyzes when exposed to moisture comprises one or more compounds containing one of more oxazolidine groups. Most preferably, the one or more compounds having at least compounds having at least one heterocyclic ring which hydrolyzes when exposed to moisture comprises one or more compounds containing one or more bisoxazolidine groups. The one or more compounds having at least one heterocyclic ring which hydrolyzes when exposed to moisture are present in sufficient amount to provide the ratio of isocyanate equivalent to equivalents of isocyanate reactive groups derivable from the one or more compounds having at least one hydrolyzable heterocylic ring as described hereinafter. Preferably the one or more compounds having at least one heterocyclic ring which hydrolyzes when exposed to moisture are present in an amount of about 1 percent by weight or greater, more preferably 2 percent by weight or greater and most preferably 3 percent by weight or greater. Preferably the one or more compounds having at least one heterocyclic ring which hydrolyzes when exposed to moisture are present in an amount of about 10 percent by weight or less, more preferably 7 percent by weight or less and most preferably 6 percent by weight or less.

The composition of the invention further comprises a solvent. Any solvent which dissolves or disperses all of the components of the composition may be used. Preferably the solvent volatilizes away under ambient conditions. Preferably the solvent has a boiling point of between about 50° C. and about 180° C. Preferred solvents include ketones, esters, ethers and hydrocarbons. More preferred solvents include ketones and acetates, with methyl ethyl ketone, 3-methoxybutyl acetate and ethyl acetate being most preferred. The solvent is present in sufficient amount to disperse or dissolve the other components of the invention. Preferably the solvent is present in an amount of about 35 percent by weight or greater, more preferably about 40 percent by weight or greater, more preferably about 45 percent by weight or greater and most preferably about 50 percent by weight or greater. Preferably the solvent is present in an amount of about 85 percent by weight or less, more preferably about 75 percent by weight or less, and most preferably about 70 percent by weight or less.

The composition of the invention further comprises one or more amine or organometallic polyurethane catalysts known to the skilled artisan for the reaction of isocyanate groups with isocyanate reactive groups. Preferably, the catalysts are not volatile at ambient conditions. Such compounds are well known in the art. Preferred catalysts include organometallic compounds, amine based catalysts or mixtures thereof. Preferably, a mixture of a organometallic compounds and an amine based catalyst is utilized. Among preferred organometallic catalysts are metal alkanoates, metal acetates, and metal acetylacetonates. Preferred metal alkanoate catalysts include bismuth, zinc, potassium and sodium alkanoates, such as bismuth octoate, bismuth neodecanoate, zinc octoate, potassium octoate, and sodium octoate. Metal acetates include potassium acetate. Metal acetyl acetonates include iron acetyl acetonate and dibutyl tin diacetylacetonate. Preferred metal salt catalysts contain bismuth or tin as the metal, with tin most preferred. Preferred amine catalysts include dimorpholinodialkyl ether, di((dialkylmorpholino)alkyl)ethers, bis-(2-dimethylamino-ethyl)ether, triethylene diamine, pentamethyldiethylene triamine, N,N-dimethylcyclo-hexylamine, N,N-dimethyl piperazine 4-methoxyethyl morpholine, N-methylmorpholine, N-ethyl morpholine, and mixtures thereof. A preferred dimorpholinodialkyl ether is dimorpholinodiethyl ether. A preferred di((dialkyl-morpholino)alkyl) ether is (di-(2-(3,5-dimethylmorpholino)ethyl)ether). Tertiary amines are employed in an amount sufficient to catalyze the reaction of isocyanate groups with isocyanate reactive groups. Preferably the tertiary amines are utilized in amounts, based on the weight of the composition of the invention, of about 0.15 parts by weight or greater and most preferably about 0.2 parts by weight or greater. Preferably the tertiary amines are utilized in amounts, based on the weight of the composition of the invention, of about 2.0 parts by weight or less, more preferably about 1.75 parts by weight or less, even more preferably about 1.0 part by weight or less and most preferably about 0.4 parts by weight or less. Organometallic compound based catalysts, when employed are preferably employed in an amount, based on the weight of the composition of the invention, of about 5 parts by weight or greater, more preferably about 0.01 parts by weight or greater, and most preferably about 0.02 parts by weight or greater. Such organometallic compound based catalysts are preferably employed in an amount, based on the weight of the adhesive composition of about 5 parts by weight or less, more preferably about 2.0 parts by weight or less, even more preferably about 1 part by weight or less and most preferably about 0.6 parts by weight or less.

The composition of the invention may further comprise one or more film forming resins. The film forming resin is preferably a high molecular weight resin. The film forming resins are present for the purpose of forming a film which provides strength to the composition of the invention when deposited on the surface of a substrate. Any high substrate. Any high molecular weight resin which forms a film upon evaporation of the solvent may be used. The high molecular weight resin can have functional groups which react the into adhesive system or which react with the surface of the substrate. Alternatively, reactive functional groups are not required for the high molecular weight resin to work in the compositions of the invention. Examples of preferred film-forming resin are resins containing one or more functional groups comprising vinyl, acrylate, styrenic, diene, methacrylate, allyl, thiolene, vinyl ether, unsaturated ester, imide, N-vinyl, acrylamide containing groups and mixtures thereof and the like. Preferred functional groups are acrylate functional groups. The resins preferably have a molecular weight which facilitates the formation of a strong film upon evaporation of the solvent. Preferably the high molecular weight resins have an weight average molecular weight of about 5,000 or greater, more preferably about 10,000 or greater and most preferably about 15,000 or greater. Preferably the high molecular weight resins have a weight average molecular weight of about 200,000 or less, more preferably about 150,000 or less and most preferably about 100,000 or less. The film forming resins are present in sufficient amount to form a film on the substrate. Preferably the film forming resin is present in an amount of about 0 percent by weight or greater and most preferably about 1 percent by weight or greater. Preferably the film forming resin is present in an amount of about 8 percent by weight or less and most preferably about 3 percent by weight or less.

The composition of the invention may further comprise one or more reinforcing fillers such as carbon black to give the composition the desired color, viscosity and sag resistance. One or more reinforcing fillers may be used in the composition and is preferably one or more carbon blacks. The carbon black used in this invention may be a standard carbon black which is not specially treated to render it nonconductive. Standard carbon black is carbon black which is not specifically surface treated or oxidized. One or more nonconductive carbon blacks may be used in conjunction with the standard carbon black, although such inclusion may add unnecessary costs. The amount of carbon black in the composition is that amount which provides the desired color, viscosity, and sag resistance. The carbon black is preferably used in the amount of about 0 percent by weight or greater based on the weight of the composition, more preferably about 2 percent by weight or greater and most preferably about 4 percent about 4 percent by weight or greater. The carbon black is preferably about 20 percent by weight or less based on the weight of the composition, more preferably about 15 percent by weight or less and most preferably about 12 percent by weight or less. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and Printex™30 carbon black available from Degussa. Nonconductive carbon blacks are well known in the art and include Raven™ 1040 and RAVEN™ 1060 carbon black available from Colombian.

The composition of the invention may further contain a component that fluoresces when illuminated by ultraviolet light. Fluorescing components are readily available from numerous sources, for example Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the primer must be sufficient so that the area of the window treated with the primer is apparent when the window is illuminated with an ultraviolet light. The composition of the invention may further comprise a stabilizing amount of an organophosphite. The organophosphite is preferably present in a sufficient amount to enhance the durability of bond of the adhesive composition to the substrate surface. In a preferred embodiment, the composition of the invention includes a light stabilizer. Any light stabilizer which facilitates the system maintaining durable bond to the substrate for a significant portion of the life of the structure to which it is bonded may be used. In another preferred embodiment, the composition of the invention further comprises an ultraviolet light absorber. Any ultraviolet absorber which enhances the durability of the bond of the adhesive to the substrate may be used. Preferred UV light absorbers include benzophenones and benzotriazoles. Such additives are described in US Patent Publication 2006-0124225, incorporated herein by reference.

In order for the composition to provide both good adhesion to the substrate surface and long open time, the ratio of aromatic isocyanate groups to aliphatic isocyanate groups is important. If the ratio is too high, the open time is shortened and if it is too low, the primer will not bond well to certain substrates. Preferably, the ratio is about 0.5:1.0 about 0.5:1.0 or greater, more preferably about 0.8:1.0 or greater, even more preferably about 0.9:1.0 or greater, even more preferably about 1.0:1.0 or greater and most preferably about 1.05:1.0 or greater. Preferably, the ratio is about 1.5:1.0 or less, more preferably about 1.3:1.0 or less and most preferably about 1.2:1.0 or less. Also the ratio of isocyanate groups present to the number of equivalents of isocyanate reactive groups which result when the one or more compounds having at least one heterocyclic ring which hydrolyzes when exposed to moisture is preferably about 0.8:1.0 or greater and more preferably about 1.0:1.0 or greater and most preferably about 1.5:1.0 or greater. The ratio of isocyanate groups present to the number of equivalents of isocyanate reactive groups which result when the one or more compounds having at least one heterocyclic ring which hydrolyzes when exposed to moisture is preferably about 5.3:1.0 or less, more preferably about 5.0:1.0 or less; even more preferably about 2.7:1.0 or less and most preferably about 1.7:1.0 or less. In a most preferred embodiment, the ratio of isocyanate groups present to the number of equivalents of isocyanate reactive groups which result when the one or more compounds having at least one heterocyclic ring which hydrolyzes when exposed to moisture is preferably from about 1.5 to about 1.7. If the ratio is too low, the composition will not link up well to the substrate and if the ratio is too high the composition will not exhibit long open times. The composition of the invention preferably contains about 1 percent by weight or greater of alkoxy silanes and more preferably 2 percent by weight or greater. Preferably the composition of the invention contains 10 percent by weight or less of alkoxysilane groups and preferably 4 percent by weight or less.

The composition is prepared by contacting the components in solvent and mixing to form a solution or dispersion. It is preferable to perform the mixing in a moisture free environment to prevent premature reaction of the isocyanate groups and the alkoxysilane groups.

The system of the invention can utilize any an adhesive having one or more functional groups selected from acrylic, methacrylic, isocyanate, siloxy or mixtures thereof which are designed for bonding to plastics, metal, coated metal, glass, composites and the like. Preferred adhesive systems are adhesives having, isocyanate groups, siloxy groups or combination of isocyanate and siloxy groups. Most preferred are adhesive systems having isocyanate groups or isocyanate and siloxy groups. Examples of preferred adhesive systems having isocyanate groups or having isocyanate and siloxy groups are and siloxy groups are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions, incorporated herein by reference. The polyisocyanate functional adhesives useful in the invention generally comprise a prepolymer having isocyanate functionality, a catalyst for the cure of the prepolymer and other additives well known to those skilled in the art. The prepolymers used in the invention can be conventional prepolymers used in polyurethane adhesive compositions. In a preferred embodiment the prepolymers are blended with a compound or polymer having silane functionality. In another preferred embodiment the prepolymer contains silane functionality as well as isocyanate functionality. A urethane prepolymer having silane functionality may be used as the entire prepolymer used in the adhesive or it may be blended with a prepolymer which does not have silane functionality. In one embodiment, the adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes, with the most preferred being the polyethers. Examples of such adhesive compositions are those disclosed in Mahdi, U.S. 2002/01550 A1. Even more preferably the polymer is a polyether having silane moieties capable of silanol condensation. In some embodiments, the polymers useful in the invention are polymers as disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; or Suzuki et al., U.S. Pat. No. 5,650,467, all incorporated herein by reference. More preferably such polymers are oxyalkylene polymers containing at least one reactive silicon group per molecule.] The terminology "siloxy group", "reactive silicon group" or "reactive silane capable of silanol condensation" means a silicon-containing group in which a hydrolyzable group or a hydroxyl group is bonded to the silicon atom and which is cross-linkable through silanol condensation reaction. The hydrolyzable group is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy-group, a mercapto group, and an alkenyloxy group. An alkoxy group is more preferred with a methoxy or ethoxy group being most preferred, for ease in handling due to their preferred, for ease in handling due to their mild hydrolyzability. One to three hydroxyl groups or hydrolyzable groups may be bonded to one silicon atom. Where two or more hydroxyl groups or hydrolyzable groups are present per reactive silicon group, they may be the same or different. The reactive silicon group may have one or more silicon atoms.

The compositions of the invention can be used as primers for a variety of substrates such as plastics, such plastics may have high and/or low surface energies, sheet molding compounds, metals, composites, coated metals, glass and wood. The compositions of the invention can be used to assemble substrates of the same material and substrates of any mixture of the described materials. The compositions of the invention are preferably utilized to bond low surface energy plastic substrates to one another or to other kinds of substrates. In one preferred embodiment one or more substrates having a low surface energy may be bonded to one or more substrates not having a low energy surface or having a high energy surface. In another embodiment, the substrate is sheet molding compound and such surface can be bonded to any other kind of substrate. When used with a low surface energy plastic, the surface of the low surface energy plastic can be surface treated prior to application of the composition of the invention. Any known surface treatment means which increases the number of polar groups present on the surface of the plastic may be utilized, including flame treatment, corona discharge, chemical etching and the like.

In general, the method of bonding substrates together comprises contacting the composition of the invention with the surface of the substrate and allowing the solvent of the composition of the invention to volatilize away. Thereafter, a suitable adhesive is applied to the surface of the substrate along the portion of the substrate which is to be bonded to one or more other substrates. The adhesive is thereafter contacted with the second substrate such that the adhesive is disposed between the substrates. The adhesive is allowed to cure to form a durable bond between the substrates.

The composition of the invention may be applied by any means well known in the art. It may be applied manually by brushing, rolling or applying a cloth containing the composition to the surface of a substrate to which the adhesive will be applied such that a sufficient amount of the composition of the invention is applied to the surface. Preferably, the composition is applied using a robot. Useful robots for this operation are for example is M710I, available from Fanuc Robotics America, of Rochester Hills, Mich. used with an automated primer dispense applicator supplied by Nordson Corporation, Amherst, Ohio. The composition is applied such that there is at least about 8 to about 15 seconds of dry time after priming. Preferably, the adhesive is applied at least 20 seconds after application of the composition. The composition is applied in sufficient amount to form a coherent film. Preferably, the film exhibits a thickness of about 1 micron or greater after the solvent volatilizes away, more preferably about 3 microns or greater and most preferably 5 microns or greater. Preferably, the film exhibits a thickness of about 20 microns or less after the solvent volatilizes away, more preferably about 16 microns or less and most preferably 14 microns or less.

In some embodiments, the adhesive composition is applied to the substrate shortly after application of the composition of the invention. The minimum time between application of the composition of the invention and application of the adhesive is that time necessary for the solvent to volatilize away. In some embodiments, the adhesive may be applied in a different location from the location of application of the composition of the invention, for instance in a different part of the plant or a different plant. Further, the plants can be many miles apart, for instance hundreds or thousands of miles apart. The adhesive composition may be applied at a time much later than the application of the composition of the invention. The time period between applying the primer composition of the invention and applying the adhesive to the surface can be any time period wherein the primer composition of the invention is still capable of linking up to the adhesive. In some embodiments, the time between application of the composition of the invention and the adhesive composition can be preferably about 5 days or greater, more preferably 30 days or greater, even more preferably about 3 months (ninety days) or greater, even more preferably about 9 months or greater and most preferably up to about 1 year. The time period between application of the composition of the invention and the adhesive composition can be about one year or less, more preferably about 9 months or less and even more preferably about 90 days or less and preferably about 60 days or less.

One process for applying a primer to a window comprises the steps of: (a) directing light onto the window to illuminate a portion of the substrate; (b) applying a composition of the invention along the illuminated portion of the window. If the composition contains a component that evaporates, then the process can further include the step of forming an infrared image of the substrate as the component evaporates to indicate the area of application of the composition. If the composition contains a component that fluoresces when illuminated by ultraviolet light, then the process can further include the step of illuminating the substrate with ultraviolet light to indicate the area of application of the composition. These processes may be performed as disclosed in commonly assigned U.S. Patent Publication 2003/0232152A1 and PCT Application WO 2003/106579 filed Jun. 11, 2003, incorporated herein by reference (WO 03/19745).

The adhesive composition is applied to a substrate and the adhesive on the first substrate is thereafter contacted with a second substrate. Thereafter, the adhesive is exposed to curing conditions. In a preferred embodiment one substrate is low surface energy plastic and the other substrate is a plastic, metal, fiberglass or composite substrate which may optionally be painted. Generally, the primers and adhesives are applied at ambient temperature in the presence of atmospheric moisture. Exposure to atmospheric moisture is sufficient to result in curing of the adhesive. Curing may be further accelerated by applying heat to the curing adhesive by means of convection heat, or microwave heating and/or by enhancing the amount of moisture in the atmosphere, such as by using a humidity chamber.

Preferably the bonded adhesive system exhibits the following properties when tested according to the following tests. Preferably, the bonding system of the invention when bonded to flame treated polypropylene exhibits greater than about 75 percent cohesive failure after exposure to the cataplasma test as described hereinafter wherein application of the adhesive occurs about 90 days after application of the composition of the invention. Preferably the bonding system of the invention exhibits a t-peel strength, according to the process defined hereinafter of about 50 N/cm or greater and more preferably of about 60 N/cmor greater wherein application of the adhesive occurs about 28 days after application of the composition of the invention.

All percentages of components listed relative to the composition of the invention are based on the total weight of the composition. Molecular weights as described herein are number average molecular weights which may be determined by Gel Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art. Unless otherwise stated all parts and percentages are by weight and based upon the weight of the adhesive system.

Illustrative Embodiments of the Invention

The following examples are provided to illustrate the invention, but are not intended to limit the scope thereof. All parts and percentages are by weight unless otherwise indicated.

Test Methods

Substrate Preparation. Lap shear tests have been performed on several flame treated glass fiber reinforced polypropylene (PP) parts according to the following test procedure. The test surface of the e-coat samples is cleaned with heptane and dried with lint free paper. On the dry, cleaned surface the tested primer composition is applied and allowed to flash off for 15 minutes. The test surface of the PP plate is cleaned with heptane and dried with lint free paper. The dried PP surface is exposed to a flame treatment using a ARCOGAS FTS 101D instrument from ARCOTEC, Oberflächtechnik GmbH, using an air-propane mixture 50:2 without further oxygen addition, at a distance of 100 mm between flame and substrate and a substrate velocity of 600 mm/s.

Quick Knife Adhesion. In the quick knife adhesion test a primer is applied on a cleaned plastic substrate with a standardized applicator to achieve a uniform film thickness of 12 to 13 microns. After a defined flash-off time of 15 min, an adhesive bead with a defined geometry, typically 10 mm (height)×10–15 mm (width)×200 mm (length) is applied. The adhesive bead is compressed to a height of approximately 6 mm. After the exposure as described hereinafter the following test is performed. The adhesive bead is cut on the edge approximately 10 mm parallel to the substrate and peeled of in a 90° angle. At approximately each 10 mm, the peeled off bead is cut with a knife to the substrate and peeling is continued. The peeled samples are evaluated according to the percentage of cohesive failure, meaning failure within the hardened bulk of the adhesive, particularly being 1=approximately 0 percent cohesive failure, 1=approximately 25 failure, 1=approximately 25 percent cohesive failure, 3=approximately 50 percentage cohesive failure, 4=approximately 75 percentage cohesive failure and 5=approximately 100 percentage cohesive failure. As used herein with the failure mode percentages the designation a means the adhesive with or without primer exhibits delaminating from the substrate and b means the adhesive exhibits delaminating from the primer.

Exposure Cycles. The exposure cycle for the performed screening is (1) 7 days at 23° C. at 50 percent relative humidity (Rh.), (2) plus 7 days in water at 23° C., (3) 7 days at 90° C. and plus (4) 7 days of cataplasm. Cataplasm treatment includes the packaging of the sample with cotton and saturation of the cotton packaging with 10 fold water and consecutively wrapping in aluminum foil and polyethylene (PE) foil to avoid evaporation. The packed sample is exposed 7 days at 70° C., 16 h at −20° C., brought to ambient temperature and the unwrapped sample is stored 2 hours at 23° C.

Peel strength. Peel strength values are determined by applying a T-peel test using a tensile testing machine such as e.g. Zwick/Roell ZWART.PRO. The plastic parts are cut into 3×20 cm parts. Cleaning, primer and adhesive application are performed as described in the quick knife test description. The prepared samples are fixed in the equipment and samples are peeled in a 90° angle and peel strength values are determined in N/cm, where the length in cm is the width of the peeled off bead.

The ingredients used in the compositions used in the following examples are described in Table 1.

| Ingredient | Amount percentage |
|---|---|
| Prepolymer[1] | 49.49 |
| Methylene diphenylisocyanate (DESMODUR VL-R-20)[2] | 5.35 |
| Tris(isocyanatophenyl)thiophosphate adduct[7] | 3.70 |
| INCOZOL ™ LV[3] bisoxazolidine | 4.33 |
| INCOZOL ™ 4[3] urethane bisoxazolidine (4 functional, Eq wt 125) | 0.48 |
| PARALOID[4] ™ B49N acrylate based film forming resin | 1.51 |
| Carbon Black, RAVEN[5] ™ 420 | 10.04 |
| Diethyl malonate | 0.47 |
| 3-methoxy-n-butyl acetate | 2.29 |
| N,N-dimethyl piperazine (JEFFCAT ™ DMP[6]) | 0.22 |
| Methyl ethyl ketone | 22.17 |

[1]Reaction product of propoxylated pentaerythritol having a molecular weight of 426, isophorone diisocyanate and 1 mercaptopropyltrimehtoxysilane having an average of four aliphatic isocyanate groups
[2]Trademark of Bayer
[3]Trademark of Industrial Copolymers Ltd
[4]Trademark of Rohm and Haas - a thermoplastic acrylic resin having a viscosity of 60,000 Mpa · s
[5]Trademark of Columbian Chemical
[6]Trademark of Huntsman
[7]Monomeric reaction product of bis(trimethoxysilylpropyl)amine/tris(p-isocyanatophenyl)thiophosphate in the molar ratio of (2.3:1.0) which contains approximately 7 percent of ethyl acetate.

The resulting composition shows an equivalent ratio of aromatic isocyanate to aliphatic isocyanate of 1.05, a ratio of isocyanate groups to hydrolyzable equivalents of oxazolidine of 1.62 and a weight percent of silane of 1.8 and a solids content of 43 percent.

The results of testing of the primer composition with BETASEAL 1759, 1850, 1855, L1 FRB and BS L1 DCG one part polyisocyanate functional adhesives and BETAMATE 7160 one part polyisocyanate functional adhesive are compiled in Tables 2 to 7 BETASEAL and BETAMATE are trademarks of The Dow Chemical Company.

Table 2 shows the lap shear values of the composition of the invention in combination with BETASEAL 1759 adhesive on flame treated glass fiber reinforced polypropylene after flash off times of 15 minutes and exposure of 7 days 23° C./50 percent relative humidity and additional 7 days cataplasm.

TABLE 2

| 7 d 23° C./50% RH Peel Strength (MPa) | 7 d 23° C./50% RH Failure Mode % Cohesive Failure | +7 day Cataplasm Peel Strength (MPa) | +7 day Cataplasm Failure Mode % Cohesive Failure |
|---|---|---|---|
| 6.93 | 90.00 (a) | 4.04 | 75.00 (a) |

Table 3 shows the lap shear values of primers of the invention in combination with BETASEAL 1795 adhesive and BETAMATE 7160 adhesive on flame treated glass fiber reinforced polypropylene after flash off times of 24 hours and exposure of 7 days 23° C./50 percent relative humidity, 7 days of water exposure and an additional 7 days of cataplasm.

TABLE 3

| adhesive | 7 d RT cohesive failure, % | 7 d RT peel-strength, N/cm | 7 d water cohesive failure, % | 7 d water peel-strength, N/cm | 7 d cataplasm cohesive failure, % | 7 d cataplasm peel-strength, N/cm |
|---|---|---|---|---|---|---|
| BS 1759 | 100.00 | 69.47 | 90.00 | 57.21 | 100.00 | 56.70 |
| BS 1759 | 100.00 | 79.50 | 100.00 | 69.46 | 100.00 | 65.79 |
| average | 100.00 | 74.49 | 95.00 | 63.34 | 100.00 | 61.25 |
| BM7160 | 100.00 | 78.57 | 100.00 | 73.56 | 100.00 | 61.48 |

Table 4 illustrates evaluation the bonding performance of the primer composition of the invention in combination with BETASEAL 1759 adhesive on flame treated polypropylene after open times of 15 minutes and exposure of 7 days 23° C./50 percent relative humidity and additional 7 days of cataplasm.

TABLE 4

| substrate | 7 day Room Temp cohesive failure, % | 7 day Room Temp peel-strength, N/cm | 7 day cataplasm cohesive failure, % | 7 day cataplasm peel-strength, N/cm |
|---|---|---|---|---|
| flow area | 90.00 | 73 | 50.00 | 56 |
| press area | 100.00 | 82.00 | 100.00 | 69.00 |
| average | 95.00 | 77.50 | 75.00 | 62.50 |

Table 5 illustrates the Quick knife and T-peel test results of the composition of the invention in combination with BETASEAL 1759 adhesive on flame treated glass fiber reinforced polypropylene after 2 and 4 weeks of open time (23° C./50% R.H.). The primer treated glass fiber reinforced polypropylene is contacted with the adhesive 2 weeks and 4 weeks after application of the primer.

TABLE 5

| adhesive | open time weeks | 7 d RT cohesive failure, % | 7 d RT peel-strength, N/cm | 7 d water cohesive failure, % | 7 d water peel-strength, N/cm | 7 d cataplasm cohesive failure, % | 7 d cataplasm peel-strength, N/cm |
|---|---|---|---|---|---|---|---|
| BS 1759 | 2 | 100.00 | 59.64 | 90.00 | 53.23 | 90.00 | 70.02 |
| BS 1759 | 2 | 100.00 | 58.15 | 90.00 | 38.25 | 80.00 | 56.84 |
| average | 2 | 100.00 | 58.90 | 90.00 | 45.74 | 85.00 | 63.43 |
| BS L1 FRB | 4 | 90 | 75.10 | 100 | 74.57 | 90 | 75.30 |
| BS L1 DCG | 4 | 85 | 71.13 | 100 | 71.14 | 85 | 65.25 |
| average | 4 | 85.00 | 73.12 | 100.00 | 72.86 | 85.00 | 70.28 |

Table 6 illustrates Quick knife adhesion test results of primer composition of the invention in combination with different BETASEAL adhesives on e-coat after different open times at 32° C. and 80% R.H.)

TABLE 6

| adhesive | open time | 7 days at RT cohesive failure, % | +7 day in water cohesive failure, % | +7 days cataplasm [cohesive failure, %] |
|---|---|---|---|---|
| BS 1759 | 14 days | 100.00 | 100.00 | 100.00 |
| BS 1855 | 14 days | 100.00 | 100.00 | 100.00 |
| BS 1850 | 14 days | 100.00 | 100.00 | 100.00 |
| BS 1759 | 1 month | 100.00 | 100.00 | 100.00 |
| BS 1855 | 1 month | 100.00 | 100.00 | 100.00 |
| BS 1850 | 1 month | 100.00 | 85.00 (b) | 100.00 |
| BS 1759 | 3 month | 90.00 | 100.00 | 100.00 |
| BS 1855 | 3 month | 100.00 | 100.00 | 100.00 |
| BS 1850 | 3 month | 90.00 (b) | 90.00 (b) | 90.00 (b) |

Table 7 illustrates Quick knife adhesion test results of the primer composition of the invention in combination with BETASEAL 1759 adhesive on different plastics after 15 minutes open time at 32° C. and 80% R.H.

TABLE 7

| substrate | 7 days at RT cohesive failure, % | +7 days catalasm cohesive failure, % | +14 days cataplasm cohesive failure, % |
|---|---|---|---|
| SMC 8900B Menzolit | 90.00 | 90.00 | 90.00 |
| SMC 610 INOPLAST | 90.00 | 85.00 (a) | 85.00 (a) |
| PBT/ASA Ultradur | 100.00 | 85.00 (a) | 100.00 |

SMC is sheet molding compound.
PBT/ASA is a blend or polybutylene terephtalate and acrylonitrile-styreneacetate with grafted acrylic groups.

In a first composition embodiment the invention comprises a) one or more prepolymers having on average three or more aliphatic isocyanate groups and further containing alkoxysilane groups; b) one or more aromatic polyisocyanates; c) one or more compounds having at least one heterocyclic ring which hydrolyzes when exposed to moisture to form at least one isocyanate reactive group; d) one or more solvents; and e) one or more amine or organometallic polyurethane catalysts; wherein the ratio of aromatic isocyanate groups to aliphatic isocyanate groups is from about 0.5:1.0 to about 1.5:1.0 and the equivalent ratio of isocyanate groups to isocyanate reactive groups derivable from the one or more compounds having at least one hydrolyzable heterocylic ring is from about 0.8:1.0 to about 5.3:1.0. In a preferred embodiment the ratio of aromatic isocyanate groups to aliphatic isocyanate groups is from about 0.9:1.0 to about 1.5:1.0 and the equivalent ratio of isocyanate groups to isocyanate reactive groups derivable from the one or more compounds having at least one hydrolyzable heterocylic ring is from about 1.5:1.0 to about 1.7:1.0. In a second composition embodiment according to composition embodiment 1, the composition further comprises a film forming resin. In a third composition according to composition embodiment 1 or 2, b) the one or more aromatic polyisocyanates comprises one or more of polyisocyanates, polymeric polyisocyanates, or adducts of polyisocyanates with compounds having two or more isocyanate reactive groups. In a fourth composition embodiment according to any one of composition embodiments 1 to 3, b) the one or more aromatic polyisocyanates comprises i) one or more comprises one or more of polyisocyanates or polymeric polyisocyanates and ii) one or more adducts of polyisocyanates with compounds having one or more isocyanate reactive groups which further contain alkoxysilane groups. In a fifth composition embodiment according to composition embodiment 3, the one or more adducts of polyisocyanates with compounds having one or more isocyanate reactive groups comprise the reaction product of a phosphorus containing polyisocyanate and an aminoalkylsilane containing one or more isocyanate reactive groups. In a sixth composition embodiment according to any one of composition embodiments 1 to 5, the one or more compounds having at least one heterocyclic ring which hydrolyzes when exposed to moisture heterocyclic ring which hydrolyzes when exposed to moisture comprises one or more compounds containing one of more of azole groups. In a seventh composition embodiment according to any one of composition embodiments 1 to 5, the one or more compounds having at least one heterocyclic ring which hydrolyzes when exposed to moisture comprises one or more compounds containing one of more of oxazolidine groups. In an eighth composition embodiment according to any one of composition embodiments 1 to 5, the one or more compounds having at least one heterocyclic ring which hydrolyzes when exposed to moisture comprises one or more compounds containing one or more bis oxazolidine groups. In a ninth composition embodiment, according to any one of composition embodiments 1 to 8, the ratio of aromatic isocyanate groups to aliphatic isocyanate groups is about 1.0:1.0 to about 1.3:1.0. In a tenth composition embodiment according to any one of composition embodiments 1 to 8, the ratio of aromatic isocyanate groups to aliphatic isocyanate groups is about 1.05:1.0 to about 1.2:1.0. In an eleventh composition embodiment according to any one of composition embodiments 1 to 10, the molecular weight of the prepolymers having on average three or more aliphatic isocyanate groups and further containing alkoxysilane groups is from about 500 to about 6,000. In a twelfth composition embodiment according to any one of composition embodiments 1 to 11, the weight percentage of alkoxy silane groups in the composition is greater than 1.0 percent by weight based on the weight of composition. In a thirteenth composition embodiment according to any one of composition embodiments 1 to 11, the weight percentage of alkoxy silane groups in the composition is from about 1.0 to about 10 percent by weight based on the weight of composition. In a fourteenth composition embodiment according to any one of composition embodiments 1 to 13, the a) one or more prepolymers have on average four or more aliphatic isocyanate groups and further contains alkoxysilane groups. In a fifteenth composition embodiment according to any one of composition embodiments 1 to 14, the composition further comprises one or more reinforcing fillers. In a sixteenth composition embodiment according to composition embodiment 15, the one or more reinforcing fillers comprise carbon black. In a seventeenth composition embodiment according to any one of composition embodiments 1 to 16, the solvent comprises a ketone, ester, ether or hydrocarbon. In an eighteenth composition embodiment according to any one of composition embodiments 1 to 17, the solvent exhibits a boiling point of point of about 50° C. to about 180° C. In a nineteenth composition embodiment according to any one of composition embodiments 1 to 18, the film-forming resin contains one or more functional groups comprising vinyl, acrylate, styrenic, diene, methacrylate, allyl, thiolene, vinyl ether, unsaturated ester, imide, N-vinyl, acrylamide containing moieties and mixtures thereof. A twentieth composition according to any one of composition embodiments 1 to 19 wherein the film-forming resin contains acrylate functional groups. A twenty first composition according to any one of composition embodiments 1 to 20 which comprises a) from about 1 to 90 percent by weight of one or more prepolymers having on average three or more aliphatic isocyanate groups and further containing alkoxysilane groups; b) from about 1 to about 25 percent by weight of one or more aromatic polyisocyanates; c) from about 1 to about 10 percent by weight of one or more compounds having at least one heterocyclic ring which hydrolyzes when exposed to moisture to form at least one isocyanate reactive group; d) from about 45 to about 75 percent by weight of one or more solvents; e) from about 0.01 to about 5 percent by weight of one or more amine or organometallic polyurethane catalysts; 0 from about 0 to about 8 percent by weight of one or more film forming resins; g) from about 0 to about 20 percent by weight of one or more pigments; wherein the percentages are based on the total weight of the composition. A twenty second composition embodiment according to composition embodiment 21 wherein component b) comprises i) from about 3 to about 15 percent by weight of i) one or more comprises one or more of polyisocyanates or polymeric polyisocyanates and from about 1 to about 7 percent by weight of ii) one or more adducts of polyisocyanates with compounds having two or more isocyanate reactive groups which further contain alkoxysilane groups. A twenty third composition embodiment according to any one of composition embodiments 1 to 22 wherein the composition deposited onto the surface of a low energy plastic is able to link up to a polyurethane adhesive up to 3 months after deposition on the surface of the low energy plastic.

A twenty fourth embodiment comprising a system for bonding two substrates together which comprises a composition according to any one of composition embodiments 1 to 23 and an isocyanate functional adhesive. A twenty fifth system embodiment according to system embodiment 24 wherein the isocyanate functional adhesive is a one part moisture curable adhesive.

A twenty sixth embodiment comprising a method of priming a surface to enhance the bond of a polyisocyanate functional adhesive to the surface which comprises contacting a composition according to any one of composition embodiments 1 to 23 with the surface and allowing the solvent to evaporate. A twenty seventh embodiment comprising a method according to method embodiment 26 wherein the surface is a surface treated low surface energy plastic.

A twenty eighth embodiment comprising a method of bonding two substrates together which a) applying a composition according to any one of composition embodiments 1 to 23 to the surface of one or more of the substrates and allowing the solvent to evaporate away; b) applying an isocyanate functional adhesive to the surfaces of the two or more substrates to which the composition was applied according to step a); c) contacting the two or more substrates together with the adhesive disposed between the substrates; and d) allowing the adhesive to cure so as to bond the two or more substrates together. A twenty ninth embodiment comprising a method according to method embodiment 28 wherein at least one of the substrates is a surface treated low surface energy plastic. A thirtieth method embodiment according to method embodiment 28 or 29 wherein the time between the application of the primer and application of the adhesive is from about 20 second to about 3 months. A thirty first embodiment according to any one of method embodiments 28 to 30 wherein at least one substrate is a surface treated low surface energy plastic and the other substrate is not a low surface energy plastic. A thirty second embodiment according to any one of method embodiments 28 to 31 wherein after step a) one or more of the substrates are moved to another location for performance of step b).

A thirty third embodiment comprising an article comprising a substrate having deposited thereon the composition of composition embodiments 1 to 23. A thirty fourth embodiment comprising an article according to article embodiment 33 wherein the solvent has volatilized away from the composition deposited on the substrate. A thirty fifth embodiment comprising an article according to article embodiment 33 or 34 wherein at least one of the substrates is a surface treated low surface energy plastic. A thirty sixth embodiment comprising an article according to article embodiment 35 wherein at least on of the other substrates is not a surface treated low surface energy plastic. A thirty seventh embodiment comprising an article comprising a substrate having comprising a substrate having deposited thereon the composition of composition embodiments 1 to 23 without the solvent. A thirty eighth comprising an article according to article embodiment 37 wherein at least one of the substrates is a surface treated low surface energy plastic. A thirty ninth embodiment comprising an article according to article embodiment 38 wherein at least on of the other substrates is not a low surface energy plastic.

What is claimed is:

1. A composition comprising
   a) one or more prepolymers having on average three or more aliphatic isocyanate groups and further containing alkoxysilane groups;
   b) one or more aromatic polyisocyanates;
   c) one or more compounds having at least one heterocyclic ring which hydrolyzes when exposed to moisture to form at least one isocyanate reactive group;
   d) one or more solvents;
   e) one or more amine or organometallic polyurethane catalysts;
   wherein the ratio of aromatic isocyanate groups to aliphatic isocyanate groups is from about 0.5:1.0 to about 1.5:1.0 and the equivalent ratio of isocyanate groups to isocyanate reactive groups derivable from the one or more compounds having at least one hydrolyzable heterocylic ring is from about 0.8:1.0 to about 5.3:1.0.

2. A composition according to claim 1 wherein the ratio of aromatic isocyanate groups to aliphatic isocyanate groups is from about 0.9:1.0 to about 1.5:1.0 and the equivalent ratio of isocyanate groups to isocyanate reactive groups derivable from the one or more compounds having at least one hydrolyzable heterocylic ring is from about 1.5:1.0 to about 1.7:1.0.

3. A composition according to claim 1 wherein the composition further comprises a film forming resin.

4. A composition according to claim 1 wherein b) the one or more aromatic polyisocyanates comprises one or more of polyisocyanates, polymeric polyisocyanates, or adducts of polyisocyanates with compounds having two or more isocyanate reactive groups.

5. A composition according to claim 4 wherein b) the one or more aromatic polyisocyanates comprises i) one or more of polyisocyanates or polymeric polyisocyanates and ii) one or more adducts of polyisocyanates with compounds having one or more isocyanate reactive groups which further contain alkoxysilane groups.

6. A composition according to claim 4 wherein the one or more adducts of polyisocyanates with compounds having one or more isocyanate reactive groups comprise the reaction product of a phosphorus containing polyisocyanate and an aminoalkylsilane containing one or more isocyanate reactive groups.

7. A composition according to claim 1 wherein the one or more compounds having at least one heterocyclic ring which hydrolyzes when exposed to moisture comprises one or more compounds containing one of more of azole groups.

8. A composition according to claim 7 wherein the one or more compounds having at least one heterocyclic ring which hydrolyzes when exposed to moisture comprises one or more compounds containing one of more of oxazolidine groups.

9. A composition according to claim 7 wherein the one or more compounds having at least one heterocyclic ring which hydrolyzes when exposed to moisture comprises one or more compounds containing one or more bis oxazolidine groups.

10. A composition according to claim 1 wherein the weight percentage of alkoxy silane groups in the composition is from about 1.0 to about 10 percent by weight based on the weight of composition.

11. A composition according to claim 1 wherein the composition further comprises one or more reinforcing fillers.

12. A composition according to claim 1 which comprises
    a) from about 1 to 90 percent by weight of one or more prepolymers having on average three or more aliphatic isocyanate groups and further containing alkoxysilane groups;
    b) from about 1 to about 30 percent by weight of one or more aromatic polyisocyanates;
    c) from about 1 to about 10 percent by weight of one or more compounds having at least one heterocyclic ring which hydrolyzes when exposed to moisture to form at least one isocyanate reactive group;
    d) from about 35 to about 85 percent by weight of one or more solvents;
    e) from about 1 to about 5 percent by weight of one or more amine or organometallic polyurethane catalysts;
    f) from about 0 to about 8 percent by weight of one or more film forming resins;
    g) from about 0 to about 20 percent by weight of one or more pigments;
    wherein the percentages are based on the total weight of the composition.

13. A composition according to claim 12 wherein component b) comprises i) from about 3 to about 15 percent by weight of i) one or more comprises one or more of polyisocyanates or polymeric polyisocyanates and from about 1 to about 7 percent by weight of ii) one or more adducts of polyisocyanates with compounds having two or more isocyanate reactive groups which further contain alkoxysilane groups.

14. A system for bonding two substrates together which comprises a composition according to claim 1 and an adhesive having one or more functional groups selected from acrylic, methacrylic, isocyanate, siloxy or mixtures thereof.

15. A method of priming a surface to enhance the bond of a polyisocyanate functional adhesive to the surface which comprises contacting a composition according to claim 1 with the surface and allowing the solvent to evaporate.

16. A method of bonding two substrates together which comprises
    a) applying a composition according to claim 1 to the surface of one or more of the substrates and allowing the solvent to evaporate away;
    b) applying an isocyanate functional adhesive to the surfaces of the two or more substrates to which the composition was applied according to step a);
    c) contacting the two or more substrates together with the adhesive disposed between the substrates; and
    d) allowing the adhesive to cure so as to bond the two or more substrates together.

17. A method according to claim 16 wherein the time between the application of the primer and application of the adhesive is from about 20 second to about 1 year.

18. A method according to claim 17 wherein after step a) one or more of the substrates are moved to another location for performance of step b).

19. An article comprising a substrate having deposited thereon the composition of claim 1.

20. An article comprising a substrate having deposited thereon the composition of claim 1 without the solvent.

* * * * *